(12) United States Patent
Kato

(10) Patent No.: US 10,019,169 B2
(45) Date of Patent: Jul. 10, 2018

(54) DATA STORAGE APPARATUS, DATA CONTROL APPARATUS, AND DATA CONTROL METHOD

(71) Applicant: FUJITSU LIMITED, Kawasaki-shi, Kanagawa (JP)

(72) Inventor: Jun Kato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 42 days.

(21) Appl. No.: 15/012,189

(22) Filed: Feb. 1, 2016

(65) Prior Publication Data
US 2016/0224275 A1 Aug. 4, 2016

(30) Foreign Application Priority Data
Feb. 3, 2015 (JP) ................................. 2015-019767

(51) Int. Cl.
*G06F 3/06* (2006.01)
*G06F 11/20* (2006.01)

(52) U.S. Cl.
CPC .............. *G06F 3/061* (2013.01); *G06F 3/065* (2013.01); *G06F 3/0689* (2013.01); *G06F 11/2089* (2013.01)

(58) Field of Classification Search
CPC ........ G06F 3/061; G06F 3/065; G06F 3/0689; G06F 11/2089; G06F 11/2056; G06F 2201/82; G06F 2212/286
See application file for complete search history.

(56) References Cited

U.S. PATENT DOCUMENTS

| | | | |
|---|---|---|---|
| 8,335,899 B1* | 12/2012 | Meiri | G06F 11/2069 |
| | | | 711/162 |
| 9,582,214 B2* | 2/2017 | Kobashi | G06F 3/0617 |
| 2005/0066118 A1* | 3/2005 | Perry | G06F 11/1469 |
| | | | 711/112 |

(Continued)

FOREIGN PATENT DOCUMENTS

| | | |
|---|---|---|
| JP | 2009-20823 | 1/2009 |
| JP | 2011-154631 | 8/2011 |
| JP | 2012-501586 | 1/2012 |

OTHER PUBLICATIONS

EMC Corporation, "VNX MCx Multicore Everything", Part No. H12090.5, Jul. 2014, pp. 1-68.

*Primary Examiner* — Mano Padmanabhan
*Assistant Examiner* — Patrick W Borges
(74) *Attorney, Agent, or Firm* — Staas & Halsey LLP

(57) ABSTRACT

A data storage apparatus includes a storage device, a first processor storing first data at a first address region of the storage device in the first memory, the first data included in a first data writing request, and a second processor coupled to a second memory storing second data at a second address region of the storage device in the second memory, the second data included in a second data writing request, and transmit the second data at the second address region of the storage device to the first processor, wherein the first processor is configured to store a first reception number in the first memory, the first reception number indicating a reception order, store the second data at the second address region of the storage device in the first memory, store a second reception number in the first memory, the second reception number indicating a reception order.

8 Claims, 16 Drawing Sheets

(56) References Cited

U.S. PATENT DOCUMENTS

| | | | |
|---|---|---|---|
| 2005/0091451 A1* | 4/2005 | Frolund | G06F 11/1008 |
| | | | 711/114 |
| 2009/0019451 A1 | 1/2009 | Matsuzaki et al. | |
| 2010/0057785 A1 | 3/2010 | Khosravy et al. | |
| 2011/0184698 A1* | 7/2011 | Kobashi | G06F 17/30008 |
| | | | 702/176 |
| 2012/0198174 A1* | 8/2012 | Nellans | G06F 12/0804 |
| | | | 711/133 |
| 2013/0013871 A1* | 1/2013 | Ogihara | G06F 11/2089 |
| | | | 711/156 |
| 2015/0286545 A1* | 10/2015 | Brown | G06F 11/2058 |
| | | | 714/6.23 |
| 2016/0350012 A1* | 12/2016 | Tamma | G06F 3/0619 |

\* cited by examiner

FIG. 4

| MIRROR-CM CLOCK VALUE | CM-IN-CHARGE CLOCK VALUE |
|---|---|
| 1 | 2 |

| VECTOR CLOCK VALUE | CACHE DATA |
|---|---|
| (0, 1) | LBA100-200 |
| (0, 1) | LBA200-300 |
| (1, 2) | LBA200-300 |
| (1, 2) | LBA300-400 |

| VECTOR CLOCK VALUE | CACHE DATA |
|---|---|
| (1, 2) | LBA100-200 |
| (1, 2) | LBA200-300 |
| (1, 1) | LBA200-300 |
| (1, 1) | LBA300-400 |

1601

DATA STORAGE APPARATUS, DATA CONTROL APPARATUS, AND DATA CONTROL METHOD

CROSS-REFERENCE TO RELATED APPLICATION

This application is based upon and claims the benefit of priority of the prior Japanese Patent Application No. 2015-019767, filed on Feb. 3, 2015, the entire contents of which are incorporated herein by reference.

FIELD

The embodiment discussed herein is related to a data storage apparatus, a data control apparatus and a data control method.

BACKGROUND

Conventionally, in the storage system, data is redundantly stored by plural pieces of information storing apparatus in order to avoid suspension of operations. For example, an information processing apparatus can make a data writing request to all of the plural pieces of information storing apparatus and make a data reading request to all of the plural pieces of information storing apparatus.

As a related art, for example, there is a technique in which a clock list is updated by a definite clock value calculated from the minimum logical clock value, the minimum definite clock value included in the clock list is identified as a definite clock value, and the clock list is transmitted to another piece of node apparatus. Furthermore, for example, there is a technique in which data consistency is managed in association with plural pieces of apparatus by using part of serialized synchronous metadata as a clock vector and defining the clock vector as the vector of the version. Moreover, there is a technique in which the order relationship among plural programs is analyzed by calculating order values. As related-art documents, there are Japanese Laid-open Patent Publication No. 2011-154631, Japanese National Publication of International Patent Application No. 2012-501586, and Japanese Laid-open Patent Publication No. 2009-20823.

SUMMARY

According to an aspect of the invention, a data storage apparatus that receives a plurality of data writing requests, the data storage apparatus includes a storage device, a first processor coupled to a first memory and configured to store first data at a first address region of the storage device in the first memory, the first data included in a first data writing request among the plurality of data writing requests received by the first processor, and a second processor coupled to a second memory and configured to store second data at a second address region of the storage device in the second memory, the second data included in a second data writing request among the plurality of data writing requests received by the second processor, and transmit the second data at the second address region of the storage device to the first processor, wherein the first processor is configured to store a first reception number in the first memory, the first reception number indicating a reception order of the first data writing request among the plurality of data writing requests, store the second data at the second address region of the storage device in the first memory, store a second reception number in the first memory, the second reception number indicating a reception order of the second data writing request among the plurality of data writing requests, receive a data reading request, select and transmit one of the first data and the second data based on the first reception number and the second reception when the first address region overlaps the second address region and an overlapping address region of the first address region and the second address region corresponds to an address region identified by the data reading request.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanatory diagram representing one example of a vector clock according to the embodiment;

FIG. 14 is an explanatory diagram representing one example of a cache list after execution of the sequence of FIG. 13;

FIG. 16 is an explanatory diagram representing one example of a cache list after execution of the sequence of FIG. 15.

DESCRIPTION OF EMBODIMENT

In the conventional technique, at the time of data writing, communications for exclusive control are caused between pieces of information storing apparatus and the input-output performance of the information storing apparatus is lowered in some cases. For example, if plural pieces of information storing apparatus simultaneously perform writing to the same storage area, it is difficult to perform correct data writing in some cases. For this reason, the plural pieces of information storing apparatus carry out the communications for the exclusive control so as not to simultaneously perform writing to the same storage area.

Details of information storing apparatus, a storage system, and an information storing apparatus control program according to an embodiment will be described below with reference to the drawings.

Embodiment

Figure 1:
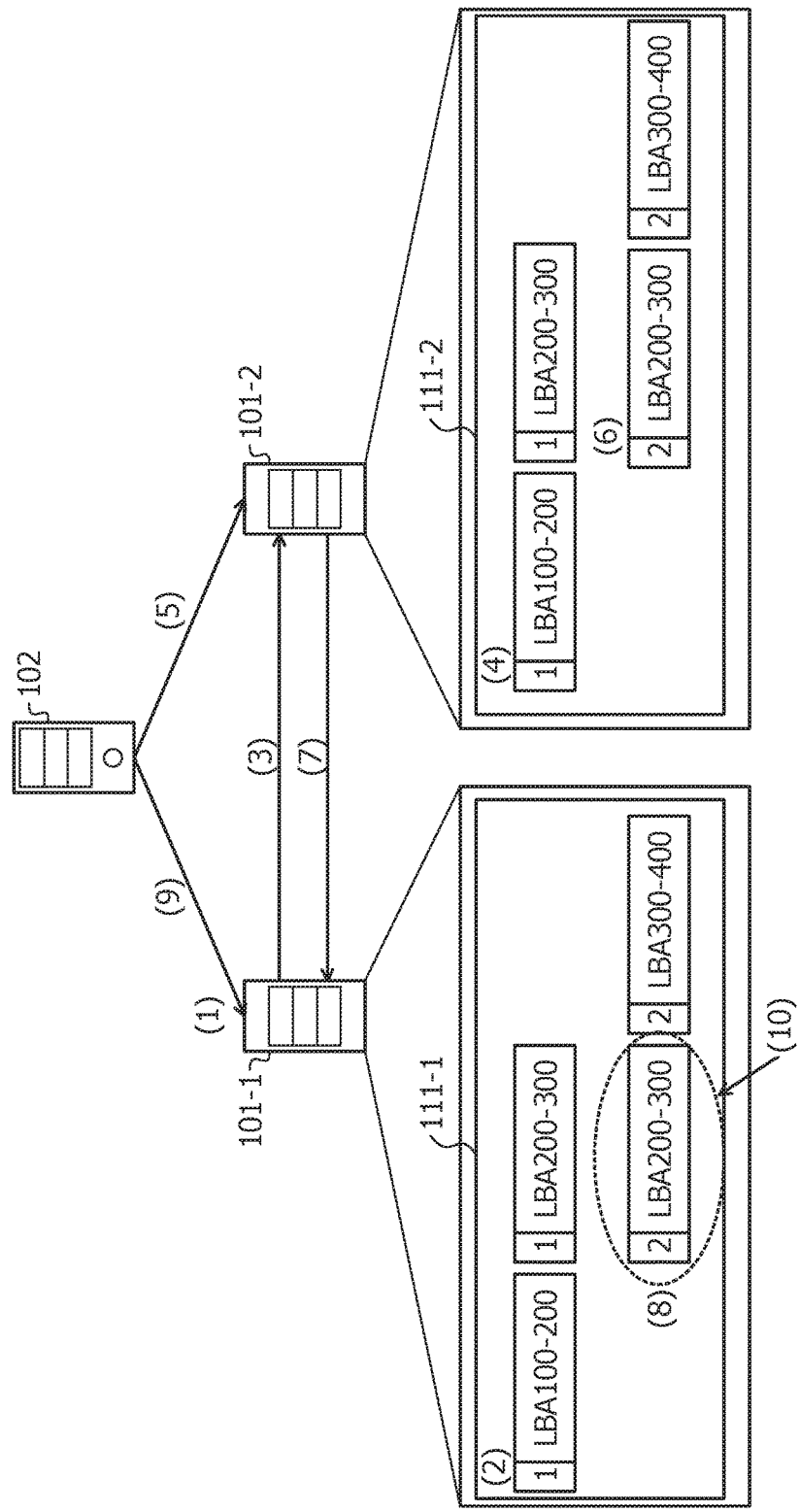
FIG. 1 is an explanatory diagram illustrating one practical example of an information storing apparatus according to an embodiment.

FIG. 1 is an explanatory diagram illustrating one practical example of information storing apparatus according to an embodiment. In FIG. 1, information storing apparatus 101 is a computer that accepts data writing requests and reading requests from information processing apparatus 102.

When accepting a data writing request from the information processing apparatus 102, the information storing apparatus 101 writes data to a cache 111 in the information storing apparatus 101. For example, when the cache 111 becomes full, the information storing apparatus 101 writes data on the cache 111 to a storage device such as a disk. Furthermore, when accepting a data reading request from the information processing apparatus 102, the information storing apparatus 101 reads data from the cache 111 in the information storing apparatus 101 or the storage device.

The information storing apparatus 101 is coupled to the information processing apparatus 102 by one or plural cables. Examples of the cable include a fiber channel cable, an Ethernet (registered trademark) cable, and a serial attached small computer system interface (SAS) cable.

Conventionally, plural pieces of apparatus, e.g. two pieces of apparatus, are operated as the information storing apparatus for redundancy and load distribution. In this case, information processing apparatus can make a data writing request and a reading request to any piece of information storing apparatus.

For this purpose, the plural pieces of information storing apparatus store the same data in the cache. To store the same data in the cache, when data is written to a certain piece of information storing apparatus, the information storing apparatus transfers the data to the other pieces of information storing apparatus.

Furthermore, because the information storing apparatus performs writing to the same storage device, the information storing apparatus carries out exclusive control between pieces of information storing apparatus. For example, if the exclusive control is not carried out and the information storing apparatus performs writing to a storage area in a storage device when another piece of information storing apparatus is performing writing to the same storage area in the same storage device, it is difficult to perform correct data writing in some cases. For example, by deciding the storage area of which the information storing apparatus is in charge in the storage device about each piece of information storing apparatus, the information storing apparatus can carry out the exclusive control of writing.

Here, the storage area in the storage device refers to an area obtained by logically dividing the storage device. The storage area in the storage device may be a physical volume or may be a logical volume. The physical volume may be a volume corresponding to one hard disk or may be a volume corresponding to a partition in a hard disk. The logical volume is a volume obtained by logically segmenting a volume group arising from aggregation of physical volumes. A logical unit number (LUN) can be used as an identifier to identify the logical volume. For example, for exclusive control of writing, the LUN of which the information storing apparatus is in charge can be specified about each piece of information storing apparatus.

For this exclusive control, when a request for writing to a storage area of which information storing apparatus is not in charge in the storage device is made, the information storing apparatus makes an inquiry about whether writing is possible to the information storing apparatus in charge of this storage area in the storage device. The information storing apparatus that receives the inquiry makes a reply about whether writing is possible. If writing is possible, the information storing apparatus to which the writing request is made transfers writing data.

As discussed above, when a request for writing to a storage area of which information storing apparatus is not in charge in the storage device is made, communication between pieces of information storing apparatus occurs twice. Therefore, compared with the request for writing to a storage area of which information storing apparatus is in charge in the storage device, the request for writing to a storage area of which information storing apparatus is not in charge in the storage device leads to the deterioration of writing performance corresponding to the communication between pieces of information storing apparatus.

As discussed above, the writing performance differs depending on the information storing apparatus to which a writing request is made. Therefore, the information processing apparatus selects the information storing apparatus to which a writing request is made in consideration of which storage area the information storing apparatus is in charge in the storage device in some cases. For this selection, the processing of the information processing apparatus increases.

Therefore, in the embodiment, the information storing apparatus 101 stores a clock value indicating writing order in association with the storage destination when storing data, and selects data to be read on the basis of the clock value of the storage destination when reading data. This exempts the information storing apparatus 101 from carrying out exclusive control at the time of writing, which reduces communication between pieces of information storing apparatus 101. This improves the input-output performance using the information storing apparatus 101. Moreover, because the information storing apparatus 101 is exempted from the exclusive control, the difference in the writing performance among pieces of information storing apparatus 101 is reduced. Therefore, the information processing apparatus 102 does not have to execute the processing of selecting the information storing apparatus 101.

One practical example of the information storing apparatus 101 according to the embodiment will be described below. In the example of FIG. 1, as the information storing apparatus 101, two pieces of apparatus, i.e. information storing apparatus 101-1 and information storing apparatus 101-2, are operated. For example, the information processing apparatus 102 can make a request for writing data to the information storing apparatus 101-1 and read this data from the information storing apparatus 101-2.

(1) The information storing apparatus 101-1 accepts a writing request from the information processing apparatus 102. Here, the information storing apparatus 101-1 receives writing data and a logical address in the storage destination of the writing data from the information processing apparatus 102. For example, the information storing apparatus 101-1 receives a LUN as the storage destination and receives a logical block addressing (LBA) as the logical address. Here, the LBA refers to a serial number assigned to a block in the disk. By specifying the LBA, the information processing apparatus 102 can specify a block in the disk.

In the example of FIG. 1, the information storing apparatus 101-1 accepts a request for writing to LBA 100-300 from the information processing apparatus 102.

(2) The information storing apparatus 101-1 writes a clock value indicating the acceptance order of the writing request and the data to a memory device in association with the logical address in the storage destination. In the writing to the memory device, the information storing apparatus 101-1 can write the data with the clock value in units of storage area in a certain range. The storage area in a certain range is 100 blocks for example. Furthermore, for example, the information storing apparatus 101-1 can write the clock value and the data to a cache 111-1. Moreover, for example, the information storing apparatus 101-1 increases the clock value when receiving the data from the information processing apparatus 102. This allows the clock value to indicate the acceptance order of the writing request.

In the example of FIG. 1, the information storing apparatus 101-1 writes the data of the writing request with the clock value to the cache 111-1 in units of 100 blocks. Furthermore, because this writing is the first writing, the clock value is "1." As a result, to the cache 111-1, data of LBA 100-200 and data of LBA 200-300 are written with the clock value "1."

(3) The information storing apparatus 101-1 transfers the clock value and the data to the information storing apparatus 101-2. The information storing apparatus 101-1 performs mirroring of the clock value and the data with the information storing apparatus 101-2 for redundancy and load distribution.

In the example of FIG. 1, the information storing apparatus 101-1 transfers the data of LBA 100-200 and the data of LBA 200-300 with the clock value "1" to the information storing apparatus 101-2.

(4) The information storing apparatus 101-2 writes the clock value indicating the acceptance order of the writing request and the data to a memory device in association with the logical address in the storage destination. For example, the information storing apparatus 101-2 can write the transferred clock value and data to a cache 111-2.

In the example of FIG. 1, the information storing apparatus 101-2 writes the data of LBA 100-200 and the data of LBA 200-300 with the clock value "1" to the cache 111-2. As a result, the contents of the data held by the cache 111-2 of the information storing apparatus 101-2 become the same as the contents of the data held by the cache 111-1 of the information storing apparatus 101-1.

(5) The information storing apparatus 101-2 accepts a writing request from the information processing apparatus 102.

In the example of FIG. 1, the information storing apparatus 101-2 accepts a request for writing to LBA 200-400 from the information processing apparatus 102.

(6) The information storing apparatus 101-2 writes a clock value indicating the acceptance order of the writing request and data to the memory device in association with a logical address in the storage destination.

In the example of FIG. 1, the information storing apparatus 101-2 writes the data of the writing request with the clock value to the cache 111-2 in units of 100 blocks.

Furthermore, since this writing is the second writing, the clock value is "2." As a result, to the cache 111-2, data of LBA 200-300 and data of LBA 300-400 are written with the clock value "2."

(7) The information storing apparatus 101-2 transfers the clock value and the data to the information storing apparatus 101-1.

In the example of FIG. 1, the information storing apparatus 101-2 transfers the data of LBA 200-300 and the data of LBA 300-400 with the clock value "2" to the information storing apparatus 101-1.

(8) The information storing apparatus 101-1 writes the clock value indicating the acceptance order of the writing request and the data to the memory device in association with the logical address in the storage destination.

In the example of FIG. 1, the information storing apparatus 101-1 writes the data of LBA 200-300 and the data of LBA 300-400 with the clock value "2" to the cache 111-1. As a result, the contents of the data in the cache 111-1 of the information storing apparatus 101-1 become the same as the contents of the data in the cache 111-2 of the information storing apparatus 101-2.

(9) The information storing apparatus 101-1 accepts a reading request from the information processing apparatus 102. Here, the information storing apparatus 101-1 receives a logical address in the storage destination of reading data from the information processing apparatus 102. For example, the information storing apparatus 101-1 receives a LUN as the storage destination and receives LBA as the logical address.

In the example of FIG. 1, the information storing apparatus 101-1 accepts a request for reading data of LBA 100-300 from the information processing apparatus 102.

(10) The information storing apparatus 101-1 selects the data to be read out on the basis of the clock value. For example, when plural clock values are associated with the storage destination, the information storing apparatus 101-1 selects the data to be read out on the basis of the clock values. For example, the information storing apparatus 101-1 compares the clock values and reads out the data stored with the maximum clock value from the cache 111-1.

In the example of FIG. 1, plural clock values are associated with LBA 200-300 in the cache 111-1. The information storing apparatus 101-1 compares the clock values "1" and "2" of the data of LBA 200-300 and selects the data of "2," which is the maximum clock value, to read out this data. Thus, the information storing apparatus 101-1 can read out the data of LBA 200-300 written later.

The example in which the information storing apparatus 101-1 accepts a request for reading data of LBA 100-300 from the information processing apparatus 102 is given above. Also when the information storing apparatus 101-2 accepts a request for reading data of LBA 100-300 from the information processing apparatus 102, the same processing is executed and the information storing apparatus 101-2 can read out the data of LBA 200-300 written later.

As described above, when storing data, the information storing apparatus 101 stores a clock value indicating the acceptance order of the writing request and the data in the memory device 111 in association with a logical address in the storage destination. In reading out the data of the logical address in the storage destination, the information storing apparatus 101 selects the data to be read out on the basis of plural clock values when the plural clock values are associated with the logical address in the storage destination.

This exempts the information storing apparatus 101 from communicating with another piece of information storing apparatus 101 and carrying out exclusive control at the time of writing, which reduces communication between pieces of information storing apparatus 101. Moreover, because the information storing apparatus 101 is exempted from the exclusive control, the difference in the writing performance among pieces of information storing apparatus 101 is reduced. Therefore, the information processing apparatus 102 does not have to execute the processing of selecting the information storing apparatus 101 with high writing performance among plural pieces of information storing apparatus 101.

(System Configuration Example of Storage System)

Figure 2:
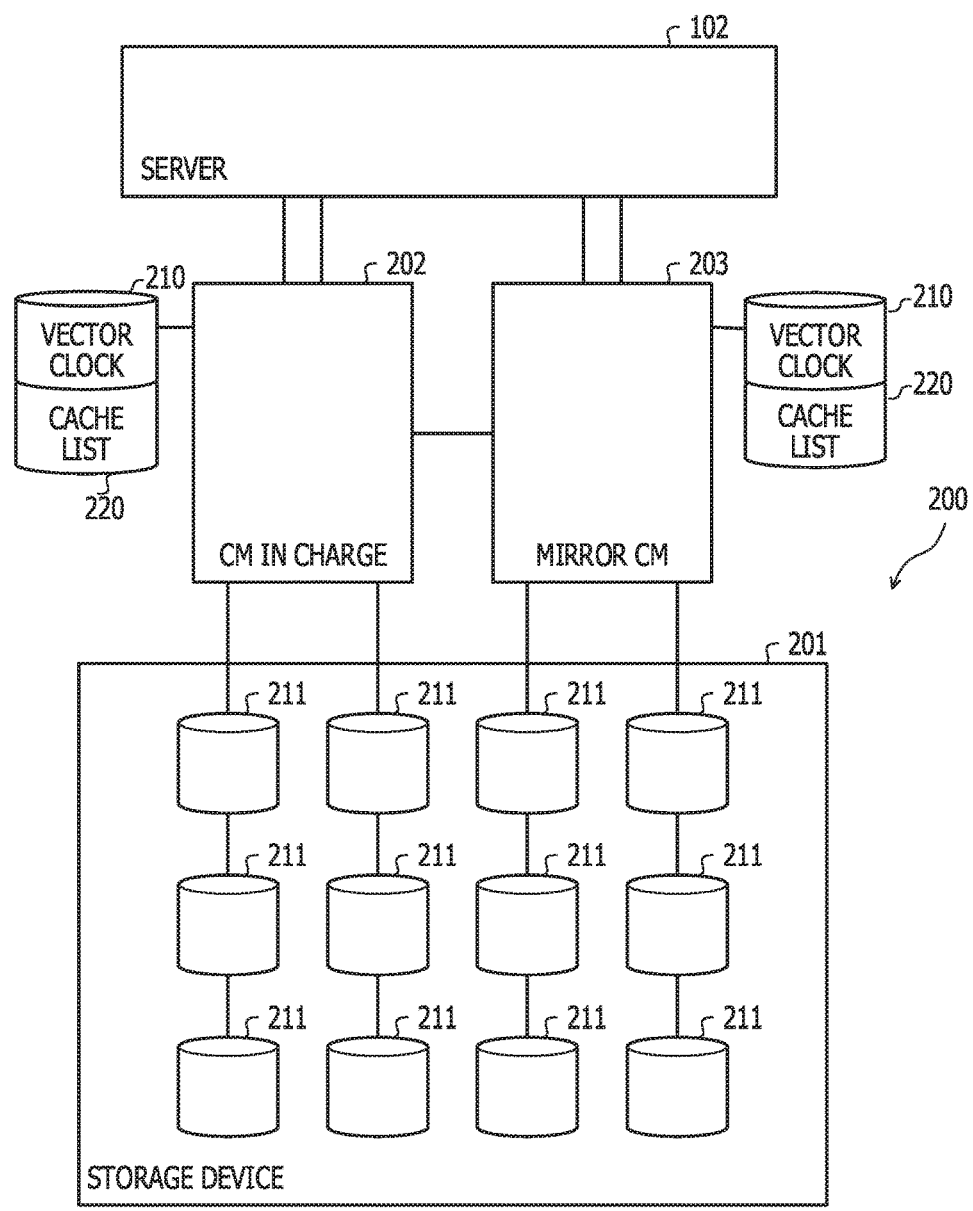
FIG. 2 is an explanatory diagram illustrating a system configuration example of a storage system according to the embodiment.

FIG. 2 is an explanatory diagram illustrating a system configuration example of a storage system according to the embodiment. In FIG. 2, a storage system 200 includes a server 102, a CM 202 in charge, a mirror CM 203, and a storage device 201. The server 102, the CM 202 in charge, the mirror CM 203, and the storage device 201 are coupled by plural cables. The information storing apparatus 101 illustrated in FIG. 1 corresponds to the CM 202 in charge and the mirror CM 203. Furthermore, the information processing apparatus 102 illustrated in FIG. 1 corresponds to the server 102.

The CM 202 in charge and the mirror CM 203 are computers that control the storage device 201 on the basis of writing and reading requests from the server 102. The server 102 is a computer that writes and reads out data to and from the storage device 201. The storage device 201 is a device that stores data. For example, the storage device 201 is a storing device such as a hard disk device or a disk array device including plural hard disks 211.

Furthermore, the CM 202 in charge and the mirror CM 203 include a vector clock 210 and a cache list 220. The clock value represented in FIG. 1 corresponds to the vector clock 210. The stored contents of the vector clock 210 and the cache list 220 will be described later by using FIGS. 4 and 5.

The CM 202 in charge is a CM that updates and saves the vector clock 210. On the other hand, the mirror CM 203 is a CM that saves the vector clock 210 updated by the CM 202 in charge. Hereinafter, the CM 202 in charge and the mirror CM 203 will be often described in the following description as a CM 101 in a description corresponding to both the CM 202 in charge and the mirror CM 203.

(Hardware Configuration Example of CM)

Figure 3:
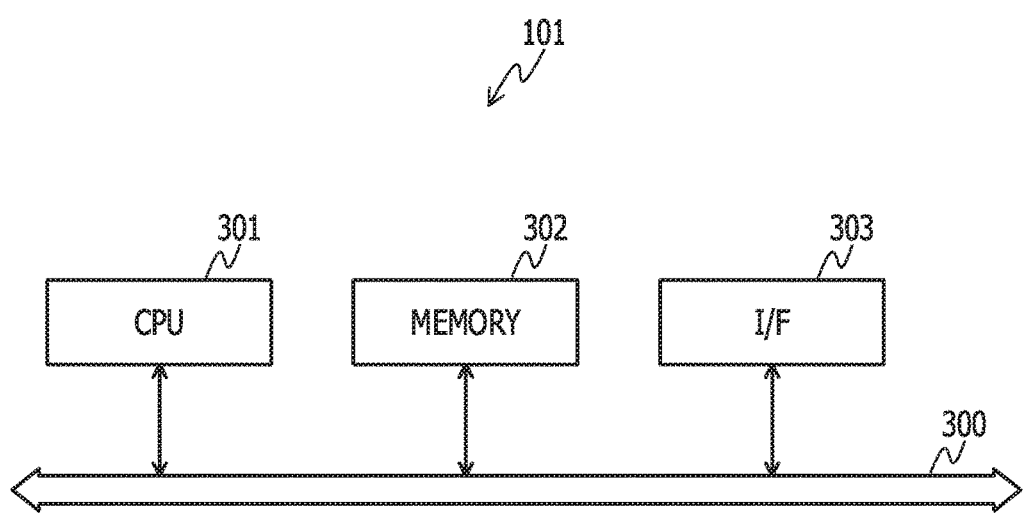
FIG. 3 is a block diagram illustrating a hardware configuration example of a controller module (CM) according to the embodiment.

FIG. 3 is a block diagram illustrating a hardware configuration example of a CM according to the embodiment. The CM in FIG. 3 may be the CM 101 illustrated in FIG. 1. In FIG. 3, the CM 101 includes a central processing unit (CPU) 301, a memory 302, and an interface (I/F) 303. The respective constituent units are coupled to each other by a bus 300.

The CPU 301 is responsible for the overall control of the CM 101. The memory 302 includes e.g. a read only memory (ROM), a random access memory (RAM), a flash ROM, and so forth. For example, the flash ROM and the ROM store various kinds of programs and the RAM is used as a work area of the CPU 301 as a storage unit. The program stored in the memory 302 is loaded by the CPU 301 and thereby causes the CPU 301 to execute processing on which coding is carried out.

The I/F 303 is a device coupled to the server 102 and the storage device 201. Furthermore, the I/F 303 controls input and output of data from and to another computer.

(One Example of Vector Clock)

FIG. 4 is an explanatory diagram representing one example of a vector clock according to the embodiment. The vector clock in FIG. 4 may be the vector clock 210 illustrated in FIG. 2. In FIG. 4, the vector clock 210 of the CM 202 in charge is created and updated by the CM 202 in charge and is stored in the memory 302 of the CM 202 in charge for example. Furthermore, the vector clock 210 of the mirror CM 203 is created and updated by the CM 202 in charge and is transferred to the mirror CM 203 to thereby be stored in the memory 302 of the mirror CM 203 for example.

The vector clock 210 includes items of a mirror-CM clock value and a CM-in-charge clock value. The vector clock 210 stores vector clock values by setting information in each item. The vector clock values refer to vector values in which a first component is the mirror-CM clock value and a second component is the CM-in-charge clock value.

The mirror-CM clock value is a value increased when the mirror CM 203 receives data of a writing request from the server 102. For example, the mirror-CM clock value is the number of times of reception of data of a writing request from the server 102 by the mirror CM 203.

For example, the mirror CM 203 stores a clock scalar value of the mirror CM 203 on the memory 302 of the mirror CM 203 and increases the clock scalar value of the mirror CM 203 when receiving data of a writing request from the server 102. The mirror CM 203 transfers the clock scalar value of the mirror CM 203 to the CM 202 in charge. This allows the CM 202 in charge to acquire the value increased when the mirror CM 203 receives data of a writing request from the server 102.

Furthermore, the CM 202 in charge can employ the maximum value of the clock scalar value of the mirror CM 203 transferred from the mirror CM 203 as the mirror-CM clock value of the vector clock 210.

Moreover, the CM-in-charge clock value is a value increased when the CM 202 in charge receives data of a writing request from the server 102 and when data of a writing request and the clock scalar value of the mirror CM 203 are transferred from the mirror CM 203 to the CM 202 in charge. For example, the CM-in-charge clock value is the sum of the number of times of reception of data of a writing request from the server 102 by the CM 202 in charge and the number of times of transfer of data of a writing request and the clock scalar value of the mirror CM 203 from the mirror CM 203 to the CM 202 in charge.

For example, the CM 202 in charge stores a clock scalar value of the CM 202 in charge on the memory 302 of the CM 202 in charge and increases the clock scalar value of the CM 202 in charge when receiving data of a writing request from the server 102. Furthermore, the CM 202 in charge increases the clock scalar value of the CM 202 in charge when data of a writing request and the clock scalar value of the mirror CM 203 are transferred from the mirror CM 203 to the CM 202 in charge.

Moreover, the CM 202 in charge can employ the clock scalar value of the CM 202 in charge as the CM-in-charge clock value of the vector clock 210.

In the example of FIG. 4, the mirror-CM clock value of the vector clock 210 indicates that the mirror CM 203 has received data of a writing request from the server 102 one time. Furthermore, the CM-in-charge clock value of the vector clock 210 indicates that the CM 202 in charge has received data of a writing request from the server 102 one time and data of a writing request and the clock scalar value of the mirror CM 203 have been transferred from the mirror CM 203 to the CM 202 in charge one time.

(One Example of Cache List)

Figure 5:
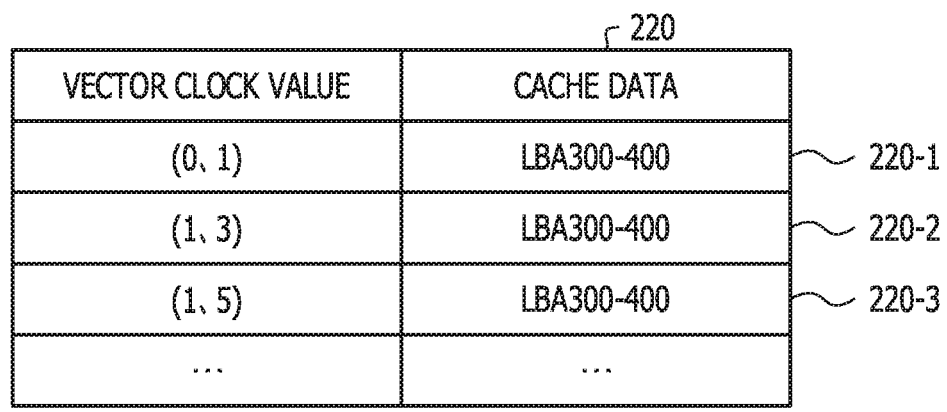
FIG. 5 is an explanatory diagram representing one example of a cache list according to the embodiment.

FIG. 5 is an explanatory diagram representing one example of a cache list according to the embodiment. The cache list in FIG. 5 may be the cache list 220 illustrated in FIG. 2. In FIG. 5, the cache list 220 of the CM 101 is created and updated by the CM 101 and is stored in the memory 302 of the CM 101 for example.

The cache list 220 includes items of a vector clock value and cache data. The cache list 220 stores cache information as one record by setting information in each item. For example, the cache list 220 represented in FIG. 5 stores pieces 220-1 to 220-3 of cache information as records.

The cache list 220 exists in each storage area in a certain range in a disk about each disk and stores data written to the storage area in the certain range. For example, the cache list 220 exists in units of 100 blocks in each disk. In this case, the cache list 220 stores data written to LBA 0-100, LBA 100-200, . . . about each disk.

The vector clock value indicates the vector clock 210 of the CM 101 at the time of storing in the cache list 220. For example, the first component of the vector clock value is the mirror-CM clock value of the vector clock 210 and the second component of the vector clock value is the CM-in-charge clock value of the vector clock 210. When the vector clock value is defined as (x, y) here, x is the first component of the vector clock value and y is the second component of the vector clock value. Furthermore, the cache data stores data received from the server 102.

In the example of FIG. 5, the cache list 220 holds data of LBA 300-400 of a disk. Furthermore, the record 220-1 indicates that data written to LBA 300-400 is stored when the vector clock 210 of the CM 101 is (0, 1).

(Functional Configuration Example of CM)

Figure 6:
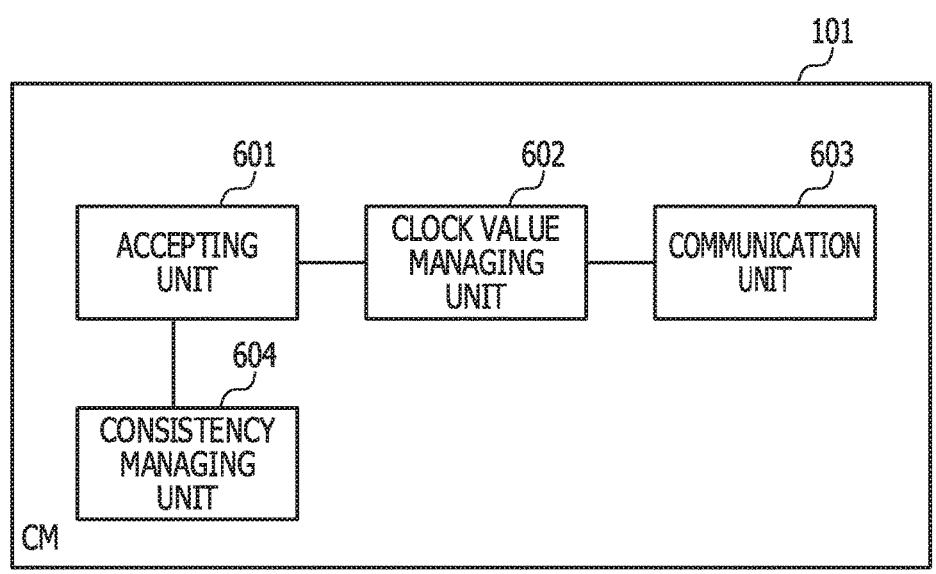
FIG. 6 is a block diagram illustrating a functional configuration example of a CM according to the embodiment.

FIG. 6 is a block diagram illustrating a functional configuration example of a CM according to the embodiment. The CM in FIG. 6 may be the CM 101 illustrated in FIG. 1. In FIG. 6, the CM 101 is a configuration including an accepting unit 601, a clock value managing unit 602, a communication unit 603, and a consistency managing unit 604. For example, a control unit including the accepting unit 601, the clock value managing unit 602, the communication unit 603, and the consistency managing unit 604 implements functions thereof by causing the CPU 301 to execute programs stored in a memory device such as the memory 302 illustrated in FIG. 3. Processing results of the respective functional units are stored in the memory device such as the memory 302 illustrated in FIG. 3 for example.

The accepting unit 601 has a function of accepting writing requests and reading requests from the server 102. When accepting a writing request from the server 102, the accepting unit 601 receives data to be written and a logical address in the storage destination of this data. Furthermore, when accepting a reading request from the server 102, the accepting unit 601 receives the logical address in the storage destination of the data to be read out. For example, the accepting unit 601 receives the LUN of the storage destination and the LBA of the logical address as the logical address in the storage destination of the data.

The clock value managing unit 602 has a function of managing the vector clock 210. For example, if the CM 101 is the CM 202 in charge, the clock value managing unit 602 stores the clock scalar value of the CM 202 in charge and the clock scalar value of the mirror CM 203.

Furthermore, if the CM 101 is the mirror CM 203, the clock value managing unit 602 stores the clock scalar value of the mirror CM 203.

Moreover, if the CM 101 is the CM 202 in charge and a writing request is accepted from the server 102, the clock value managing unit 602 increments the clock scalar value of the CM 202 in charge. For example, if a writing request is accepted from the server 102, the clock value managing unit 602 increases the clock scalar value of the CM 202 in charge by one.

In addition, if the CM 101 is the CM 202 in charge, the clock value managing unit 602 creates the vector clock 210 from the clock scalar value of the CM 202 in charge and the clock scalar value of the mirror CM 203.

Furthermore, if the CM 101 is the CM 202 in charge, the clock value managing unit 602 stores the created vector clock 210 and writing data in a cache. For example, the clock value managing unit 602 identifies the cache list 220 from a logical address in the storage destination of the data and stores the vector clock 210 and the data in the identified cache list 220. For example, the clock value managing unit 602 inputs an LUN and LBA to a hash function and stores the vector clock 210 and the data in the cache list 220 corresponding to the output value of the hash function.

Moreover, if the CM 101 is the CM 202 in charge, the clock value managing unit 602 transfers the created vector clock 210 and the writing data to the communication unit 603. Thereafter, the clock value managing unit 602 receives a completion report from the communication unit 603. Thus, if the CM 101 is the CM 202 in charge, the processing of the writing request from the server 102 ends.

Furthermore, if the CM 101 is the mirror CM 203 and a writing request is accepted from the server 102, the clock value managing unit 602 increments the clock scalar value of the mirror CM 203. For example, if a writing request is accepted from the server 102, the clock value managing unit 602 increases the clock scalar value of the mirror CM 203 by one.

Moreover, if the CM 101 is the mirror CM 203, the clock value managing unit 602 transfers the clock scalar value of the mirror CM 203 and writing data to the communication unit 603. Thereafter, the clock value managing unit 602 receives the vector clock 210 from the communication unit 603. The clock value managing unit 602 stores the received vector clock 210 and the writing data in the cache. Thus, if the CM 101 is the mirror CM 203, the processing of the writing request from the server 102 ends.

In addition, the clock value managing unit 602 has a function of storing data in the cache list 220 in a case in which a writing request is accepted from another CM 101. The case in which a writing request is accepted from another CM 101 is a case in which the CM 202 in charge transfers the vector clock 210 and data and a case in which the mirror CM 203 transfers the clock scalar value of the mirror CM 203 and data.

Furthermore, if the CM 101 is the CM 202 in charge and a writing request is accepted from the mirror CM 203, the clock value managing unit 602 increments the clock scalar value of the mirror CM 203.

Moreover, if the CM 101 is the CM 202 in charge, the clock value managing unit 602 compares the clock scalar value of the mirror CM 203 included in the writing request from the mirror CM 203 and the clock scalar value of the mirror CM 203 stored by the clock value managing unit 602. If the clock scalar value of the mirror CM 203 included in the writing request from the mirror CM 203 is larger, the clock value managing unit 602 stores the clock scalar value of the mirror CM 203 included in the writing request as the clock scalar value of the mirror CM 203.

As a result, the clock value managing unit 602 can monotonically increase the clock scalar value of the mirror CM 203. Due to this, for example even when the clock scalar value transferred by the mirror CM 203 does not arrive in the transfer order, the clock scalar value of the mirror CM 203 stored by the mirror CM 203 can be made identical to the clock scalar value of the mirror CM 203 stored by the CM 202 in charge.

For example, suppose that "2" and "3" are transferred as the clock scalar value of the mirror CM 203 stored by the mirror CM 203 in a state in which the clock scalar value of the mirror CM 203 stored by the CM 202 in charge is "1." If the clock scalar value is received in order of "2" and "3," the clock scalar value of the mirror CM 203 stored by the CM 202 in charge is also stored in order of "2" and "3." On the other hand, if "3" is received earlier, because "3" is larger than "1," the clock value managing unit 602 stores "3" as the clock scalar value of the mirror CM 203 stored by the CM 202 in charge. Thereafter, when "2" is received, because "3" is larger than "2," the clock value managing unit 602 does not store "2" as the clock scalar value of the mirror CM 203 stored by the CM 202 in charge but keeps the clock scalar value as "3."

Furthermore, if the CM 101 is the CM 202 in charge, the clock value managing unit 602 increments the clock scalar value of the CM 202 in charge. In addition, if the CM 101 is the CM 202 in charge, the clock value managing unit 602 creates the vector clock 210 from the clock scalar value of the CM 202 in charge and the clock scalar value of the mirror CM 203.

Moreover, if the CM 101 is the CM 202 in charge, the clock value managing unit 602 stores the created vector clock 210 and writing data in the cache. For example, the clock value managing unit 602 identifies the cache list 220 from a logical address in the storage destination of the data and stores the vector clock 210 and the data in the identified cache list 220.

Furthermore, if the CM 101 is the CM 202 in charge, the clock value managing unit 602 transfers the created vector clock 210 to the communication unit 603. Thus, if the CM 101 is the CM 202 in charge, the processing of the writing request from the mirror CM 203 ends.

Furthermore, if the CM 101 is the mirror CM 203 and a writing request is accepted from the CM 202 in charge, the clock value managing unit 602 stores the vector clock 210 included in the writing request from the CM 202 in charge and writing data in the cache. Thereafter, the clock value managing unit 602 transmits a completion notification to the communication unit 603. Thus, if the CM 101 is the mirror CM 203, the processing of the writing request from the CM 202 in charge ends.

The communication unit 603 has a function of carrying out communication with another CM 101. If the CM 101 is the CM 202 in charge, the communication unit 603 transfers the vector clock 210 transmitted from the clock value managing unit 602 and writing data to the mirror CM 203. Furthermore, if a completion report is transferred from the mirror CM 203, the communication unit 603 transmits the completion report to the clock value managing unit 602.

Moreover, if the CM 101 is the CM 202 in charge, the communication unit 603 transfers, to the mirror CM 203, the vector clock 210 transmitted from the clock value managing unit 602.

Furthermore, if the CM 101 is the mirror CM 203, the communication unit 603 transfers the clock scalar value of the mirror CM 203 transmitted from the clock value managing unit 602 and writing data to the CM 202 in charge. In addition, if the vector clock 210 is transferred from the CM 202 in charge, the communication unit 603 transmits the vector clock 210 to the clock value managing unit 602.

Moreover, if the CM 101 is the mirror CM 203, the communication unit 603 transfers, to the clock value managing unit 602, the vector clock 210 transmitted from the CM 202 in charge and writing data.

The consistency managing unit 604 has a function of selecting data in the cache list 220 if a reading request from the server 102 is accepted. Furthermore, the consistency managing unit 604 has a function of transmitting the selected data to the server 102.

The consistency managing unit 604 determines whether the data to be read out exists in the cache. For example, the consistency managing unit 604 identifies the cache list 220 from a logical address in the storage destination of the data and determines whether the data exists in the identified cache list 220. For example, the consistency managing unit 604 inputs an LUN and LBA to a hash function and determines whether the data exists in the cache list 220 corresponding to the output value of the hash function.

If the data to be read out does not exist in the cache, the consistency managing unit 604 reads out the data from the storage device 201. If the data to be read out exists in the cache, the consistency managing unit 604 reads out the data whose vector clock value is the largest from the cache list 220.

The consistency managing unit 604 reads out the data of the vector clock value with the largest first component among the vector clock values from the cache list 220 for example. If plural pieces of data exist as the data with the largest first component, the consistency managing unit 604 reads out the data of the vector clock value with the largest second component from the cache list 220.

For example, the consistency managing unit 604 compares the vector clock values in magnitude in accordance with a flowchart of FIG. 12 to be described later and selects the maximum vector clock value.

The mirror-CM clock value and the CM-in-charge clock value of the vector clock 210 are monotonically-increased values. Therefore, the consistency managing unit 604 can determine the order of reception of data of the writing request through the comparison of the vector clock 210. The consistency managing unit 604 can read out the data written last by reading out the data whose vector clock value is the largest from the cache list 220.

(One Example of Writing Operation to CM in Charge)

Figure 7:
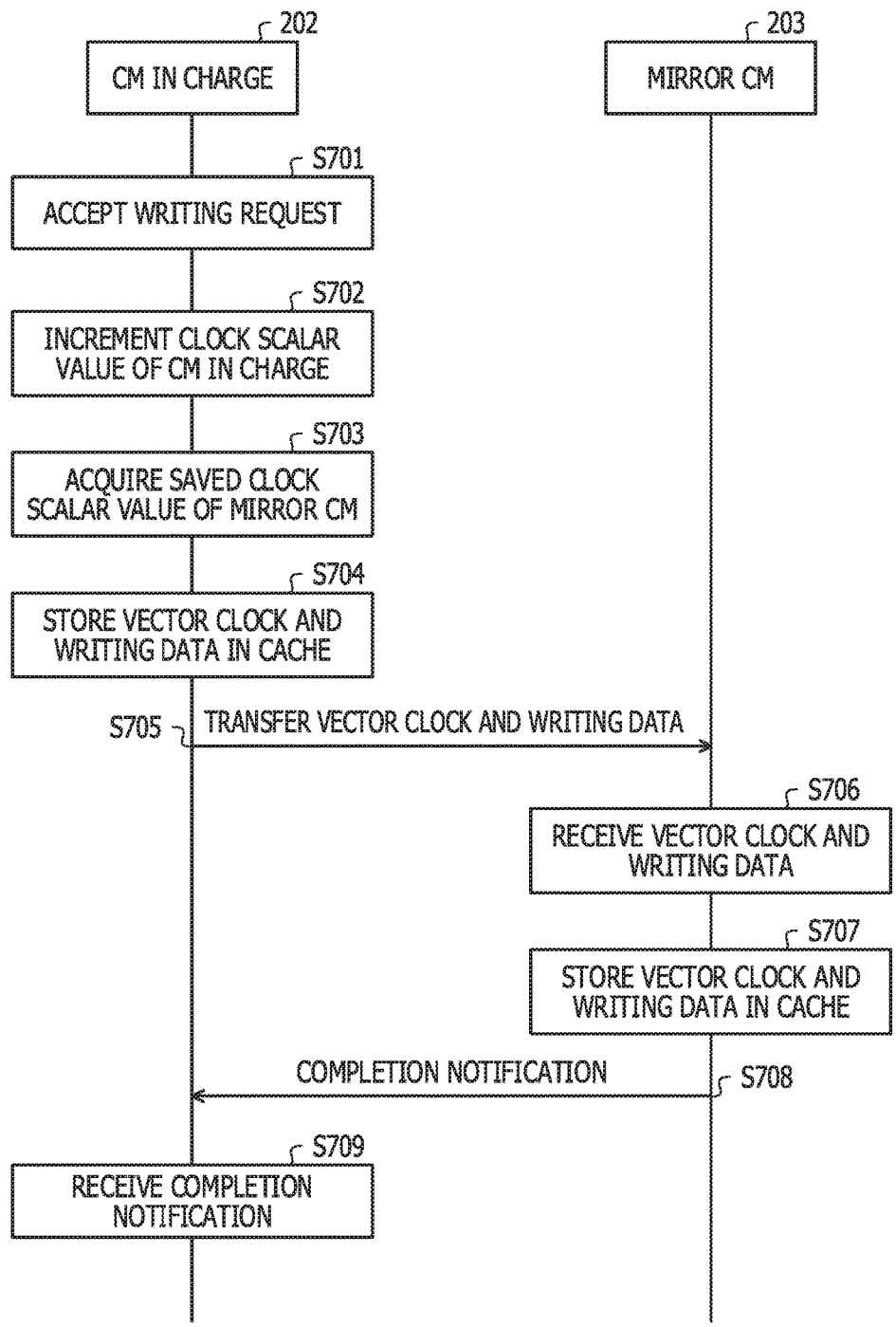
FIG. 7 is a sequence diagram representing one example of writing operation to a CM in charge according to the embodiment.

FIG. 7 is a sequence diagram representing one example of writing operation to a CM in charge according to the embodiment. The CM in charge in FIG. 7 may be the CM in charge 202 illustrated in FIG. 2. In FIG. 7, first the CM 202 in charge accepts a writing request (step S701). For example, the CM 202 in charge accepts writing of data from the server 102. At this time, the server 102 transmits the data to be written and information to specify the storage position of the data to the CM 202 in charge. The information to specify the storage position of the data is an LUN and LBA for example.

The CM 202 in charge increments the clock scalar value of the CM 202 in charge (step S702). For example, the CM 202 in charge increases the clock scalar value of the CM 202 in charge stored in the memory 302 of the CM 202 in charge by one.

The CM 202 in charge acquires the saved clock scalar value of the mirror CM 203 (step S703). For example, the CM 202 in charge acquires the clock scalar value of the mirror CM 203 stored in the memory 302 of the CM 202 in charge.

The CM 202 in charge stores the vector clock 210 and the writing data in the cache (step S704). For example, the CM 202 in charge creates the vector clock 210 from the clock scalar value of the CM 202 in charge incremented in the step S702 and the clock scalar value of the mirror CM 203 acquired in the step S703.

The CM 202 in charge transfers the vector clock 210 and the writing data to the mirror CM 203 (step S705). In response to this, the mirror CM 203 receives the vector clock 210 and the writing data from the CM 202 in charge (step S706).

The mirror CM 203 stores the vector clock 210 and the writing data that are received in the cache (step S707). The mirror CM 203 carries out a completion notification to the CM 202 in charge (step S708). In response to this, the CM 202 in charge receives the completion notification from the mirror CM 203 (step S709).

Through the above, the series of steps in the present sequence diagram ends. By carrying out the present sequence, the CM 202 in charge creates the vector clock 210 and stores the vector clock 210 and the writing data in the cache of the CM 202 in charge. Furthermore, the CM 202 in charge transfers the vector clock 210 and the writing data to the mirror CM 203 and whereby the vector clock 210 and the writing data are stored in the cache of the mirror CM 203.

(One Example of Writing Operation to Mirror CM)

Figure 8:
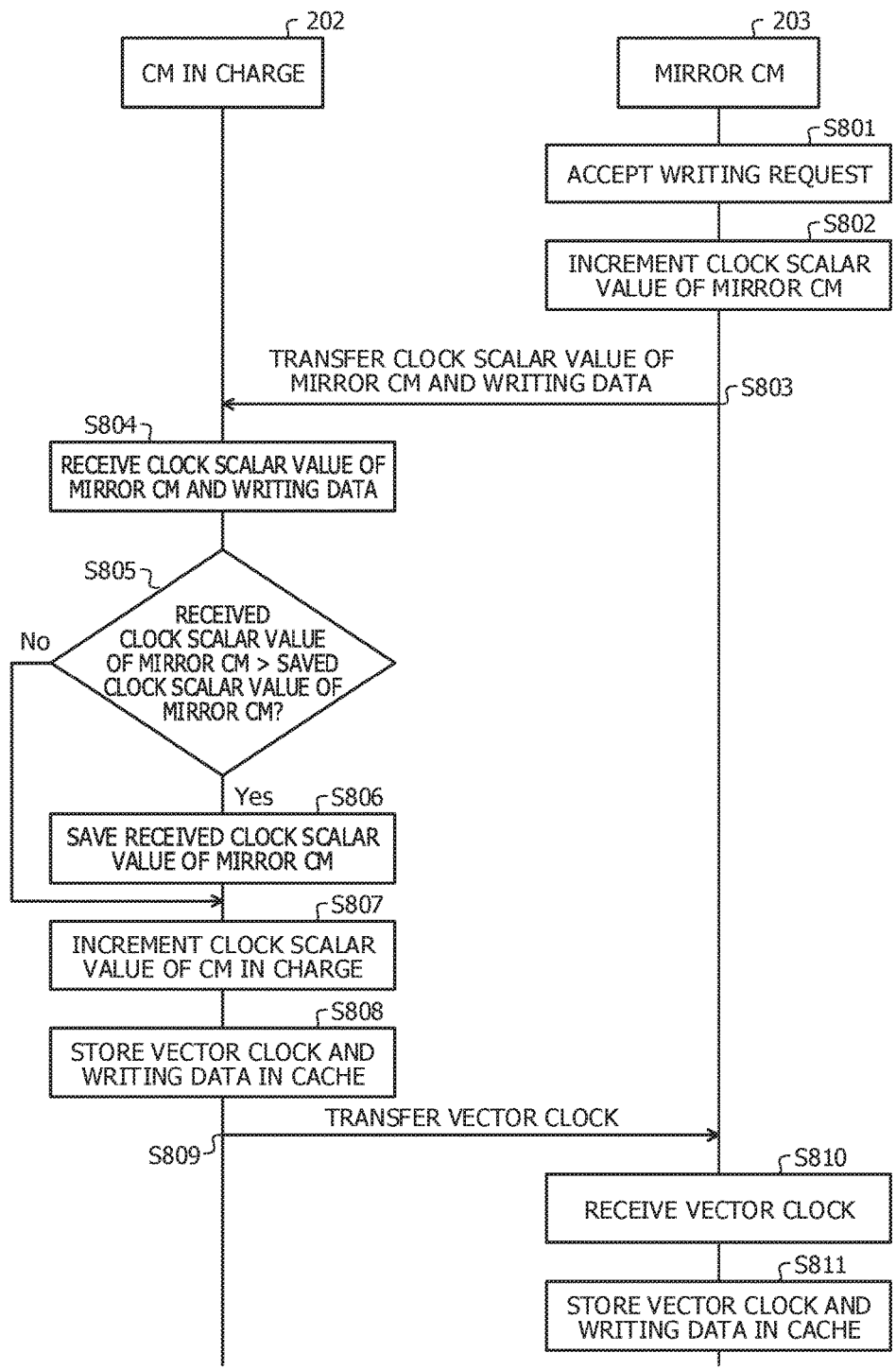
FIG. 8 is a sequence diagram representing one example of writing operation to a mirror CM according to the embodiment.

FIG. 8 is a sequence diagram representing one example of writing operation to a mirror CM according to the embodiment. The mirror CM in FIG. 8 may be the mirror CM 203 illustrated in FIG. 2. In FIG. 8, first the mirror CM 203 accepts a writing request (step S801). For example, the mirror CM 203 accepts writing of data from the server 102. At this time, the server 102 transmits the writing data and information to specify the storage position of the data to the mirror CM 203.

The mirror CM 203 increments the clock scalar value of the mirror CM 203 (step S802). For example, the mirror CM 203 increases the clock scalar value of the mirror CM 203 stored in the memory 302 of the mirror CM 203 by one.

The mirror CM 203 transfers the clock scalar value of the mirror CM 203 and the writing data to the CM 202 in charge (step S803). In response to this, the CM 202 in charge receives the clock scalar value of the mirror CM 203 and the writing data from the mirror CM 203 (step S804).

The CM 202 in charge determines whether or not the received clock scalar value of the mirror CM 203 is larger than the saved clock scalar value of the mirror CM 203 (step S805). The saved clock scalar value of the mirror CM 203 is the clock scalar value of the mirror CM 203 stored in the memory 302 of the CM 202 in charge.

If the received clock scalar value of the mirror CM 203 is larger than the saved clock scalar value of the mirror CM 203 (step S805: Yes), the CM 202 in charge saves the received clock scalar value of the mirror CM 203 (step S806). For example, the CM 202 in charge overwrites the saved clock scalar value of the mirror CM 203 by the received clock scalar value of the mirror CM 203 to save the received clock scalar value. If the received clock scalar value of the mirror CM 203 is not larger than the saved clock scalar value of the mirror CM 203 (step S805: No), the processing of the CM 202 in charge makes transition to a step S807.

The CM 202 in charge increments the clock scalar value of the CM 202 in charge (step S807). For example, the CM 202 in charge increases the clock scalar value of the CM 202 in charge stored in the memory 302 of the CM 202 in charge by one.

The CM 202 in charge stores the vector clock 210 and the writing data in the cache (step S808). For example, the CM 202 in charge creates the vector clock 210 from the clock scalar value of the CM 202 in charge incremented in the step S807 and the saved clock scalar value of the mirror CM 203.

The CM 202 in charge transfers the vector clock 210 to the mirror CM 203 (step S809). In response to this, the mirror CM 203 receives the vector clock 210 from the CM 202 in charge (step S810).

The mirror CM 203 stores the vector clock 210 and the writing data that are received in the cache (step S811). The data the mirror CM 203 stores in the cache here is the data about which the writing request is accepted in the step S801.

Through the above, the series of steps in the present sequence diagram ends. By carrying out the present sequence, the mirror CM 203 transfers the clock scalar value of the mirror CM 203 and the CM 202 in charge creates the vector clock 210. Furthermore, the vector clock 210 and the writing data are stored in the cache of the CM 202 in charge. Moreover, the CM 202 in charge transfers the vector clock 210 to the mirror CM 203 and whereby the vector clock 210 and the writing data are stored in the cache of the mirror CM 203.

(One Example of Procedure of Writing Operation Processing of CM)

Figure 9:
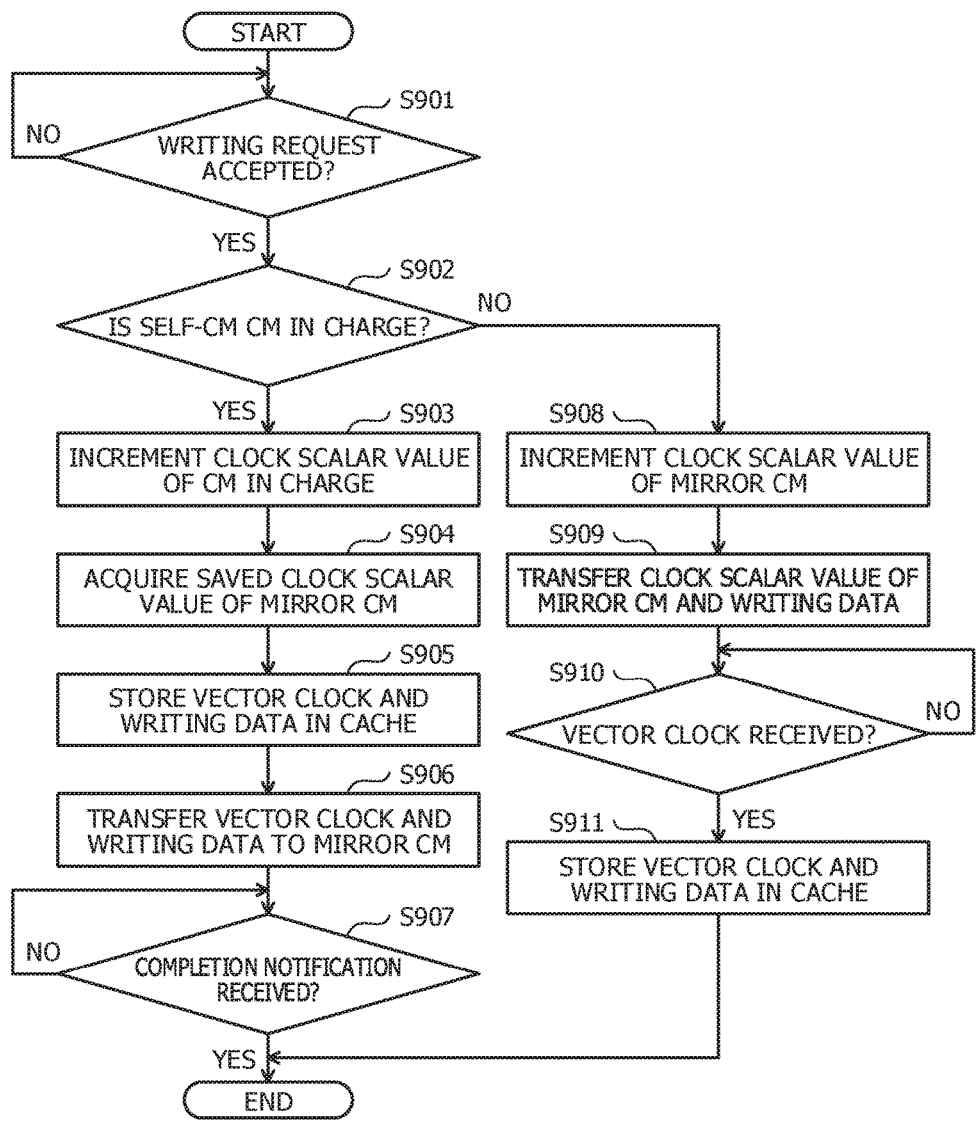
FIG. 9 is a flowchart representing one example of a procedure of writing operation processing of a CM according to the embodiment.

FIG. 9 is a flowchart representing one example of a procedure of writing operation processing of a CM according to the embodiment. The CM in FIG. 9 may be the CM 101 illustrated in FIG. 1. In FIG. 9, first the CM 101 determines whether or not a writing request is accepted (step S901). For example, the CM 101 determines whether or not writing of data has been accepted from the server 102.

If a writing request has not been accepted (step S901: No), the processing of the CM 101 returns to the step S901. If a writing request has been accepted (step S901: Yes), the CM 101 determines whether or not the self-CM is the CM 202 in charge (step S902).

If the self-CM is the CM 202 in charge (step S902: Yes), the CM 202 in charge increments the clock scalar value of the CM 202 in charge (step S903). For example, the CM 202 in charge increases the clock scalar value of the CM 202 in charge stored in the memory 302 of the CM 202 in charge by one.

The CM 202 in charge acquires the saved clock scalar value of the mirror CM 203 (step S904). For example, the CM 202 in charge acquires the clock scalar value of the mirror CM 203 stored in the memory 302 of the CM 202 in charge.

The CM 202 in charge stores the vector clock 210 and writing data in the cache (step S905). For example, the CM 202 in charge creates the vector clock 210 from the clock scalar value of the CM 202 in charge incremented in the step S903 and the clock scalar value of the mirror CM 203 acquired in the step S904.

The CM 202 in charge transfers the vector clock 210 and the writing data to the mirror CM 203 (step S906). The CM 202 in charge determines whether or not a completion notification has been received from the mirror CM 203 (step S907). If a completion notification has not been received (step S907: No), the processing of the CM 202 in charge returns to the step S907. If a completion notification has been received (step S907: Yes), the processing of the CM 202 in charge ends.

If the self-CM is not the CM 202 in charge (step S902: No), the mirror CM 203 increments the clock scalar value of the mirror CM 203 (step S908). For example, the mirror CM 203 increases the clock scalar value of the mirror CM 203 stored in the memory 302 of the mirror CM 203 by one.

The mirror CM 203 transfers the clock scalar value of the mirror CM 203 and the writing data to the CM 202 in charge (step S909). The mirror CM 203 determines whether or not the vector clock 210 has been received from the CM 202 in charge (step S910). If the vector clock 210 has not been received (step S910: No), the processing of the mirror CM 203 returns to the step S910.

If the vector clock 210 has been received (step S910: Yes), the mirror CM 203 stores the vector clock 210 and the writing data that are received in the cache (step S911). Along with this, the processing of the mirror CM 203 ends.

Through the above, the series of processing in the present flowchart ends. By carrying out the present flowchart, the CM 101 stores the data about which the writing request is made from the server 102 in the cache in association with the vector clock 210.

(One Example of Procedure of Reception Data Processing of CM)

Figure 10:
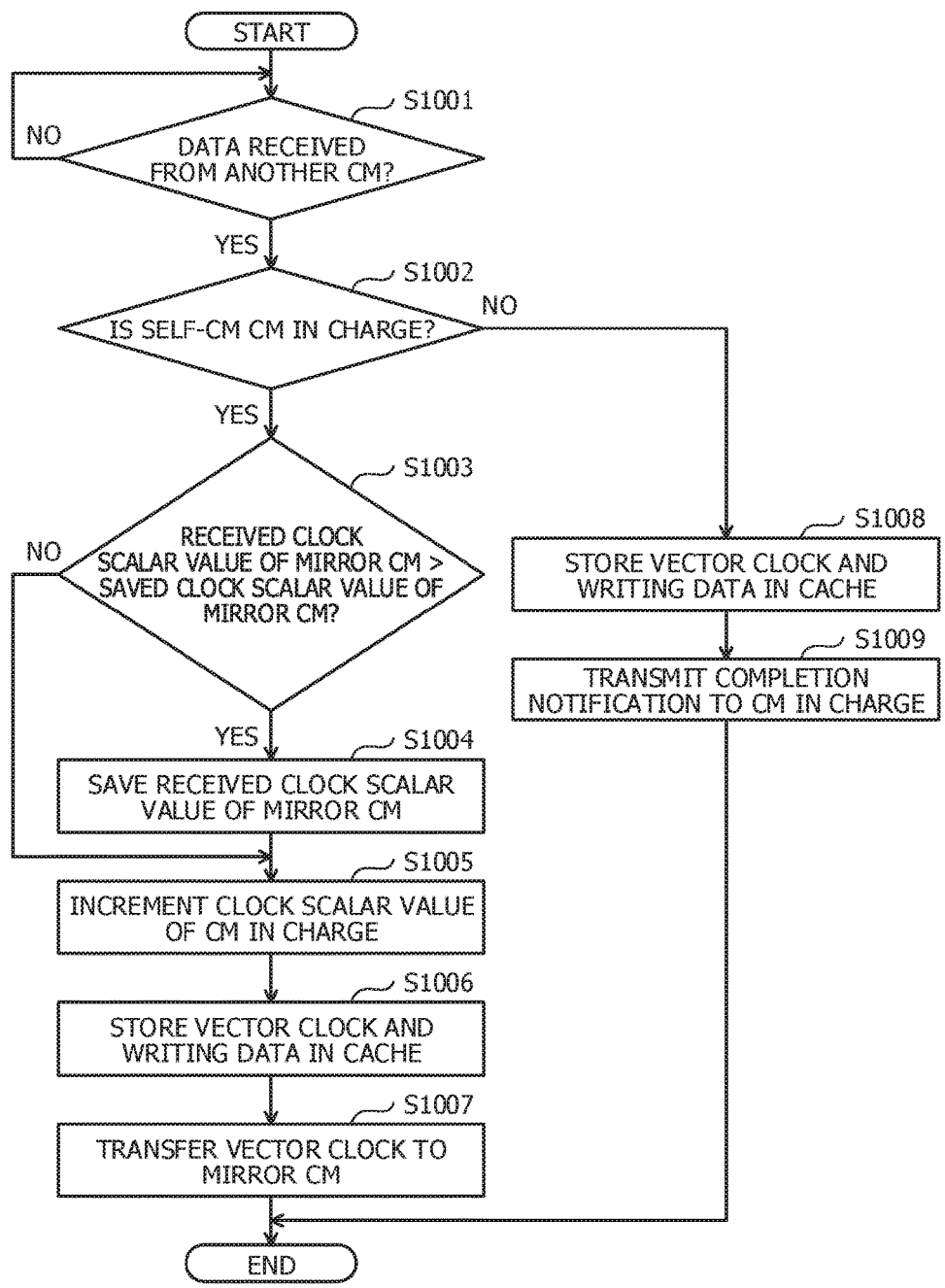
FIG. 10 is a flowchart representing one example of a procedure of reception data processing of a CM according to the embodiment.

FIG. 10 is a flowchart representing one example of a procedure of reception data processing of a CM according to the embodiment. The CM in FIG. 10 may be the CM 101 illustrated in FIG. 1. In FIG. 10, first the CM 101 determines whether or not data has been received from another CM 101 (step S1001). For example, the CM 101 determines whether or not writing data and the vector clock 210 have been received from another CM 101. Furthermore, for example, the CM 101 determines whether or not writing data and the clock scalar value of the mirror CM 203 have been received from another CM 101.

If data has not been accepted (step S1001: No), the processing of the CM 101 returns to the step S1001. If data has been accepted (step S1001: Yes), the CM 101 determines whether or not the self-CM is the CM 202 in charge (step S1002).

If the self-CM is the CM 202 in charge (step S1002: Yes), the CM 202 in charge determines whether or not the received clock scalar value of the mirror CM 203 is larger than the saved clock scalar value of the mirror CM 203 (step S1003). The saved clock scalar value of the mirror CM 203 is the clock scalar value of the mirror CM 203 stored in the memory 302 of the CM 202 in charge.

If the received clock scalar value of the mirror CM 203 is larger than the saved clock scalar value of the mirror CM 203 (step S1003: Yes), the CM 202 in charge saves the received clock scalar value of the mirror CM 203 (step S1004). For example, the CM 202 in charge overwrites the saved clock scalar value of the mirror CM 203 by the received clock scalar value of the mirror CM 203 to save the received clock scalar value. If the received clock scalar value of the mirror CM 203 is not larger than the saved clock scalar value of the mirror CM 203 (step S1003: No), the processing of the CM 202 in charge makes transition to a step S1005.

The CM 202 in charge increments the clock scalar value of the CM 202 in charge (step S1005). For example, the CM 202 in charge increases the clock scalar value of the CM 202 in charge stored in the memory 302 of the CM 202 in charge by one.

The CM 202 in charge stores the vector clock 210 and the writing data in the cache (step S1006). For example, the CM 202 in charge creates the vector clock 210 from the clock scalar value of the CM 202 in charge incremented in the step S1005 and the saved clock scalar value of the mirror CM 203.

The CM 202 in charge transfers the vector clock 210 to the mirror CM 203 (step S1007). Along with this, the processing of the CM 202 in charge ends.

If the self-CM is not the CM 202 in charge (step S1002: No), the mirror CM 203 stores the vector clock 210 and the writing data that are received in the cache (step S1008). The mirror CM 203 transmits a completion notification to the CM 202 in charge (step S1009). Along with this, the processing of the mirror CM 203 ends.

Through the above, the series of processing in the present flowchart ends. By carrying out the present flowchart, the CM 101 stores the data received from another CM 101 in the cache in association with the vector clock 210.

(One Example of Procedure of Reading Operation Processing of CM)

Figure 11:
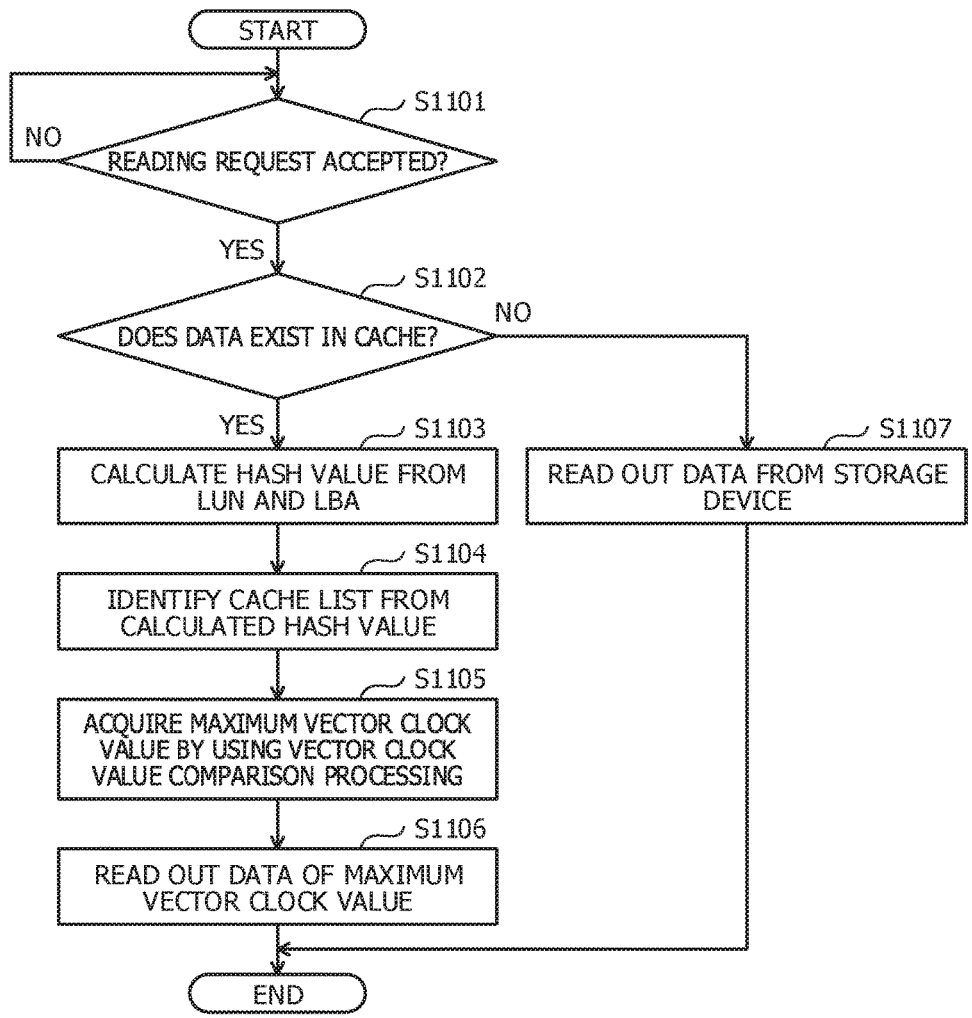
FIG. 11 is a flowchart representing one example of a procedure of reading operation processing of a CM according to the embodiment.

FIG. 11 is a flowchart representing one example of a procedure of reading operation processing of a CM according to the embodiment. The CM in FIG. 11 may be the CM 101 illustrated in FIG. 1. In FIG. 11, first the CM 101 determines whether or not a reading request has been accepted (step S1101). For example, the CM 101 determines whether or not reading of data has been accepted from the server 102.

If a reading request has not been accepted (step S1101: No), the processing of the CM 101 returns to the step S1101. If a reading request has been accepted (step S1101: Yes), the CM 101 determines whether or not the data exist in the cache (step S1102).

If the data exist in the cache (step S1102: Yes), the CM 101 calculates a hash value from an LUN and LBA (step S1103). The LUN is information indicating the device in which the data to be read out is stored and the LBA is information indicating the position at which the data to be read out is stored in the device identified by the LUN.

The CM 101 identifies the cache list 220 from the calculated hash value (step S1104). The CM 101 acquires the maximum vector clock value by using vector clock value comparison processing (step S1105). The vector clock value comparison processing is processing of obtaining the maximum vector clock value from plural vector clock values. The vector clock value comparison processing will be described later by using FIG. 12.

The CM 101 reads out data of the maximum vector clock value (step S1106). For example, the CM 101 reads out cache data of a record whose vector clock value is the largest in the cache list 220.

If the data do not exist in the cache (step S1102: No), the CM 101 reads out the data from the storage device 201 (step S1107).

Through the above, the series of processing in the present flowchart ends. By carrying out the present flowchart, the CM 101 reads out the data about which the reading request is made from the server 102 from the cache or the storage device 201.

(One Example of Processing of Writing Operation to Storage Device by CM)

The processing of writing operation to the storage device 201 by the CM 101 is carried out in a procedure similar to the procedure of the reading operation processing of the CM 101. Therefore, diagrammatic representation of the processing of writing operation to the storage device 201 by the CM 101 is omitted. The difference from the reading operation processing of the CM 101 is, for example, that the step S1102 and the step S1107 in FIG. 11 do not exist because data exist in the cache.

(One Example of Procedure of Vector Clock Value Comparison Processing of CM)

Figure 12:
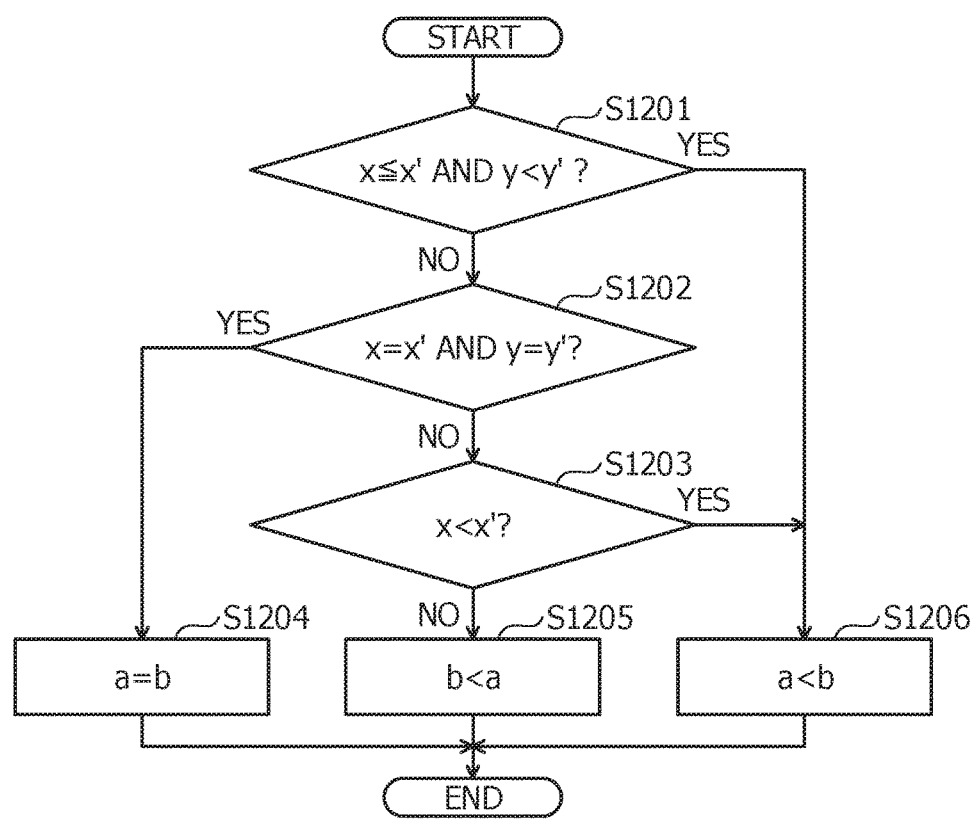
FIG. 12 is a flowchart representing one example of a procedure of vector clock value comparison processing of a CM according to the embodiment.

FIG. 12 is a flowchart representing one example of a procedure of vector clock value comparison processing of a CM according to the embodiment. The CM in FIG. 12 may be the CM 101 illustrated in FIG. 1. In the present flowchart, a vector clock value a=(x, y) is compared with a vector clock value b=(x', y') and the magnitude relationship between the vector clock value and the vector clock value b is output.

First, the CM 101 determines whether or not x≤x' and y<y' are satisfied (step S1201). If x≤x' and y<y' are satisfied (step S1201: Yes), the CM 101 determines that vector clock value a<vector clock value b is satisfied (step S1206).

If x≤x' and y<y' are not satisfied (step S1201: No), the CM 101 determines whether or not x=x' and y=y' are satisfied (step S1202). If x=x' and y=y' are satisfied (step S1202: Yes), the CM 101 determines that vector clock value a=vector clock value b is satisfied (step S1204).

If x=x' and y=y' are not satisfied (step S1202: No), the CM 101 determines whether or not x<x' is satisfied (step S1203). If x<x' is satisfied (step S1203: Yes), the CM 101 determines that vector clock value a<vector clock value b is satisfied (step S1206). If x<x' is not satisfied (step S1203: No), the CM 101 determines that vector clock value b<vector clock value is satisfied (step S1205).

Through the above, the series of processing in the present flowchart ends. By carrying out the present flowchart, the CM 101 outputs the magnitude relationship between the vector clock value a and the vector clock value b.

(One Example of Update of Vector Clock Value in Writing Processing from CM in Charge)

Figure 13:
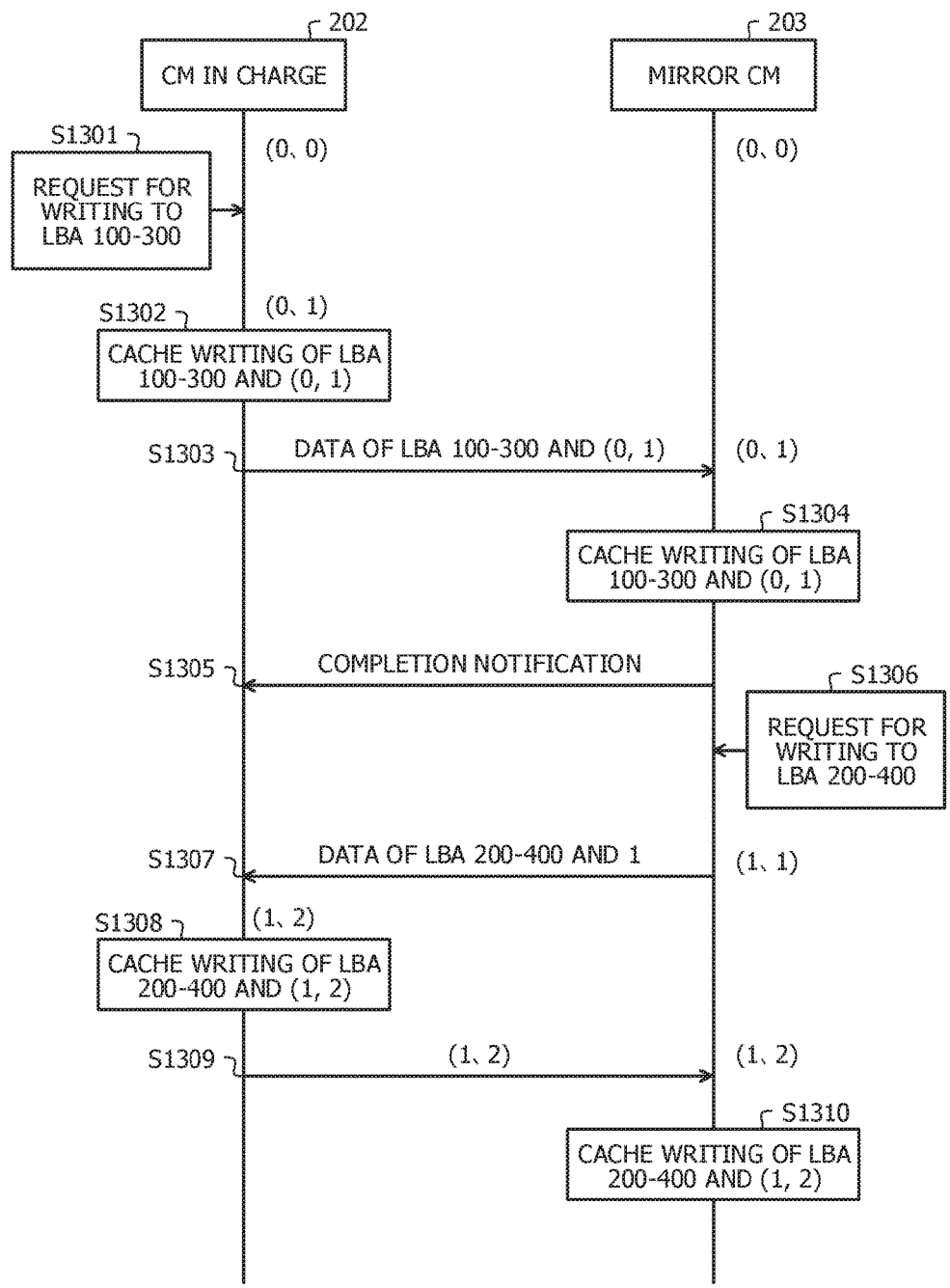
FIG. 13 is a sequence diagram representing one example of update of a vector clock value in writing processing from a CM in charge according to the embodiment.

FIG. 13 is a sequence diagram representing one example of update of a vector clock value in writing processing from a CM in charge according to the embodiment. The CM in charge in FIG. 13 may be the CM in charge 202 illustrated in FIG. 2. FIG. 13 is one example of the sequence diagrams of FIGS. 7 and 8.

In FIG. 13, in the vector clock 210, the mirror-CM clock value and the CM-in-charge clock value are both "0." Furthermore, the clock scalar value of the CM 202 in charge and the clock scalar value of the mirror CM 203 stored by the CM 202 in charge are also both "0." In addition, the clock scalar value of the mirror CM 203 stored by the mirror CM 203 is also "0."

In the above state, the CM 202 in charge accepts a request for data writing to LBA 100-300 (step S1301). Because receiving writing data from the server 102, the CM 202 in charge turns the clock scalar value of the CM 202 in charge from "0" to "1."

The CM 202 in charge acquires the clock scalar value "0" of the mirror CM 203. The CM 202 in charge creates the vector clock 210 "(0, 1)" from the clock scalar value "1" of the CM 202 in charge and the clock scalar value "0" of the mirror CM 203.

The CM 202 in charge stores the vector clock 210 "(0, 1)" and the writing data in the cache in association with LBA 100-300 (step S1302). The CM 202 in charge transfers the vector clock 210 "(0, 1)" and the data to be written to LBA 100-300 to the mirror CM 203 (step S1303). In response to this, the mirror CM 203 stores the vector clock 210 "(0, 1)" and the writing data received from the CM 202 in charge in the cache (step S1304). The mirror CM 203 carries out a completion notification to the CM 202 in charge (step S1305).

Next, the mirror CM 203 accepts a request for data writing to LBA 200-400 (step S1306). Because receiving writing data from the server 102, the mirror CM 203 turns the clock scalar value of the mirror CM 203 from "0" to "1."

The mirror CM 203 transfers the clock scalar value "1" of the mirror CM 203 and the data to be written to LBA 200-400 to the CM 202 in charge (step S1307). Because the received clock scalar value "1" of the mirror CM 203 is larger than the saved clock scalar value "0" of the mirror CM 203, the CM 202 in charge saves the received clock scalar value "1" of the mirror CM 203.

Furthermore, because receiving the writing data and the clock scalar value of the mirror CM 203 from the mirror CM 203, the CM 202 in charge turns the clock scalar value of the CM 202 in charge from "1" to "2." The CM 202 in charge creates the vector clock 210 "(1, 2)" from the clock scalar value "2" of the CM 202 in charge and the clock scalar value "1" of the mirror CM 203.

The CM 202 in charge stores the vector clock 210 "(1, 2)" and the writing data in the cache in association with LBA 200-400 (step S1308). The CM 202 in charge transfers the vector clock 210 "(1, 2)" to the mirror CM 203 (step S1309). In response to this, the mirror CM 203 stores, in the cache, the vector clock 210 "(1, 2)" received from the CM 202 in charge and the data received in the step S1306 (step S1310).

(One Example of Cache List after Execution of Sequence of FIG. 13)

FIG. 14 is an explanatory diagram representing one example of a cache list after execution of the sequence of FIG. 13. By carrying out the sequence of FIG. 13, a cache list 1401 is created in the caches of the CM 202 in charge and the mirror CM 203.

Suppose that a request for reading of data of LBA 200-300 is made to the CM 202 in charge. In this case, the CM 202 in charge compares the plural vector clock values "(0, 1)" and "(1, 2)" and determines that the vector clock value "(1, 2)" is larger. For example, in the two vector clock values, the first component is larger in "(1, 2)." Thus, the CM 202 in charge determines that "(1, 2)" is larger. Therefore, the CM 202 in charge reads out the data of LBA 200-300 with the vector clock value "(1, 2)" from the cache.

In this manner, the CM 202 in charge can read out the data of the writing request of the step S1306 in FIG. 13 later than the writing request of the step S1301. Because the cache of the mirror CM 203 is also the same as the cache of the CM 202 in charge, the same result is obtained even when a request for reading of the data of LBA 200-300 is made to the mirror CM 203.

(One Example of Update of Vector Clock Value in Writing Processing from Mirror CM)

Figure 15:
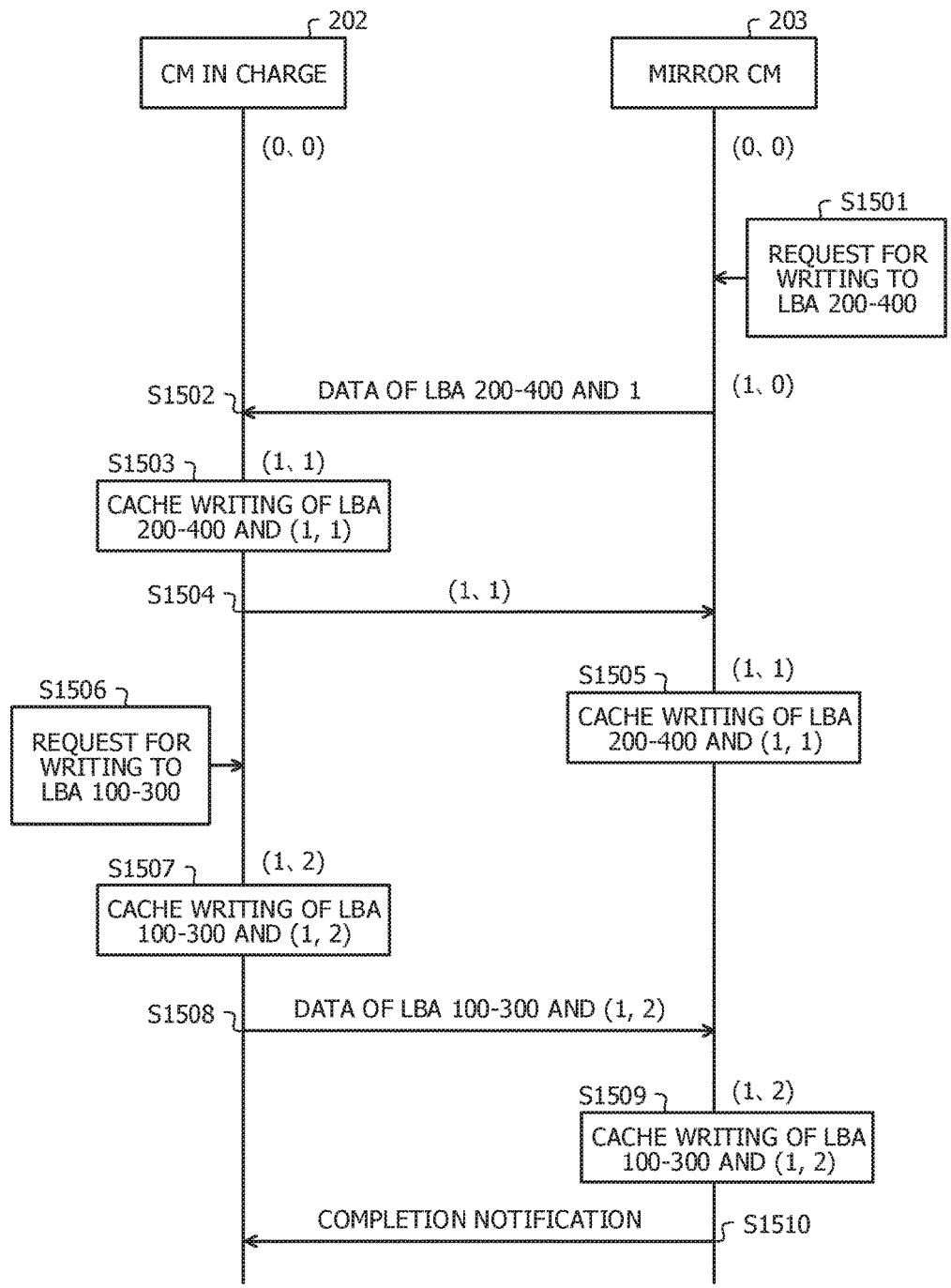
FIG. 15 is a sequence diagram representing one example of an update of a vector clock value in writing processing from a mirror CM according to the embodiment.

FIG. 15 is a sequence diagram representing one example of update of a vector clock value in writing processing from a mirror CM according to the embodiment. The mirror CM in FIG. 15 may be the mirror CM 203 illustrated in FIG. 2. FIG. 15 is one example of the sequence diagrams of FIGS. 7 and 8.

In FIG. 15, in the vector clock 210, the mirror-CM clock value and the CM-in-charge clock value are both "0." Furthermore, the clock scalar value of the CM 202 in charge and the clock scalar value of the mirror CM 203 stored by the CM 202 in charge are also both "0." In addition, the clock scalar value of the mirror CM 203 stored by the mirror CM 203 is also "0."

In the above state, the mirror CM 203 accepts a request for data writing to LBA 200-400 (step S1501). Because receiving writing data from the server 102, the mirror CM 203 turns the clock scalar value of the mirror CM 203 from "0" to "1."

The mirror CM 203 transfers the clock scalar value "1" of the mirror CM 203 and the data to be written to LBA 200-400 to the CM 202 in charge (step S1502). Because the received clock scalar value "1" of the mirror CM 203 is larger than the saved clock scalar value "0" of the mirror CM 203, the CM 202 in charge saves the received clock scalar value "1" of the mirror CM 203.

Furthermore, because receiving the writing data and the clock scalar value of the mirror CM 203 from the mirror CM 203, the CM 202 in charge turns the clock scalar value of the CM 202 in charge from "0" to "1." The CM 202 in charge creates the vector clock 210 "(1, 1)" from the clock scalar value "1" of the CM 202 in charge and the clock scalar value "1" of the mirror CM 203.

The CM 202 in charge stores the vector clock 210 "(1, 1)" and the writing data in the cache in association with LBA 200-400 (step S1503). The CM 202 in charge transfers the vector clock 210 "(1, 1)" to the mirror CM 203 (step S1504). In response to this, the mirror CM 203 stores, in the cache, the vector clock 210 "(1, 1)" received from the CM 202 in charge and the data received in the step S1501 (step S1505).

Next, the CM 202 in charge accepts a request for data writing to LBA 100-300 (step S1506). Because receiving writing data from the server 102, the CM 202 in charge turns the clock scalar value of the CM 202 in charge from "1" to "2."

The CM 202 in charge acquires the clock scalar value "1" of the mirror CM 203. The CM 202 in charge creates the vector clock 210 "(1, 2)" from the clock scalar value "2" of the CM 202 in charge and the clock scalar value "1" of the mirror CM 203.

The CM 202 in charge stores the vector clock 210 "(1, 2)" and the writing data in the cache in association with LBA 100-300 (step S1507). The CM 202 in charge transfers the vector clock 210 "(1, 2)" and the data to be written to LBA 100-300 to the mirror CM 203 (step S1508). In response to this, the mirror CM 203 stores the vector clock 210 "(1, 2)" and the writing data received from the CM 202 in charge in the cache (step S1509). The mirror CM 203 carries out a completion notification to the CM 202 in charge (step S1510).

(One Example of Cache List after Execution of Sequence of FIG. 15)

FIG. 16 is an explanatory diagram representing one example of a cache list after execution of the sequence of FIG. 15. By carrying out the sequence of FIG. 15, a cache list 1601 is created in the caches of the CM 202 in charge and the mirror CM 203.

Suppose that a request for reading of data of LBA 200-300 is made to the CM 202 in charge. In this case, the CM 202 in charge compares the plural vector clock values "(1, 2)" and "(1, 1)" and determines that the vector clock value "(1, 2)" is larger. For example, in the two vector clock values, the first component is the same and the second component is larger in "(1, 2)." Thus, the CM 202 in charge determines that "(1, 2)" is larger. Therefore, the CM 202 in charge reads out the data of LBA 200-300 with the vector clock value "(1, 2)" from the cache.

In this manner, the CM 202 in charge can read out the data of the writing request of the step S1506 in FIG. 15 later than the writing request of the step S1501. Because the cache of the mirror CM 203 is also the same as the cache of the CM 202 in charge, the same result is obtained even when a request for reading of the data of LBA 200-300 is made to the mirror CM 203.

As described above, when storing data, the CM 101 stores a clock value indicating the acceptance order of the writing request and the data in the cache in association with a logical address in the storage destination. In reading out the data of the logical address in the storage destination, the CM 101 selects the data to be read out on the basis of plural clock values when the plural clock values are associated with the logical address in the storage destination.

This exempts the CM 101 from communicating with another CM 101 and carrying out exclusive control at the time of writing, which reduces communication between the CMs 101. This improves the input-output performance using the CM 101. Moreover, because the CM 101 is exempted from the exclusive control, the difference in the writing performance among the CMs 101 is reduced. Therefore, the server 102 does not have to execute the processing of selecting the CM 101 with high writing performance among plural CMs 101.

Furthermore, the clock value can include the first clock value and the second clock value. The first clock value can be a value increased when the mirror CM 203 receives data from the server 102. In addition, the second clock value can be a value increased when data and the first clock value of the mirror CM 203 are received from the mirror CM 203. Moreover, the CM 101 can select the data whose first clock value is the largest in plural clock values. If plural pieces of data exist as the data whose first clock value is the largest, the CM 101 can select the data whose second clock value is the largest.

This allows the CM 101 to select the last data in the order of writing by comparing the clock values. Furthermore, by reading out the selected last data, the CM 101 can read out correct data even if the data is redundantly stored.

Furthermore, when storing data received from the server 102, the CM 101 can also transfer the clock value and the received data to another CM 101. Moreover, in response to receiving the clock value and data from another CM 101, the CM 101 can also store the clock value and the data received from the other CM 101 in the cache in association with a logical address in the storage destination.

Due to this, the CM 101 can allow another CM 101 to store the same data and can increase the redundancy. In addition, data written to the CM 101 can be read out from another CM 101 and thus load distribution is also enabled.

Furthermore, when storing data received from the server 102, the mirror CM 203 can transmit, to the CM 202 in charge, the clock scalar value of the mirror CM 203 increased when the data is received from the server 102 and the received data. In addition, in response to receiving the clock scalar value of the mirror CM 203 from the mirror CM 203, the CM 202 in charge can generate the clock value based on a clock scalar value received before the reception of this clock scalar value and the received clock scalar value.

Moreover, the CM 202 in charge can store the generated clock value and the received data in the cache in association with a logical address in the storage destination and transfer the clock value to the mirror CM 203. In addition, in response to receiving the clock value from the CM 202 in charge, the mirror CM 203 can store the clock value received from the CM 202 in charge and the data received from the server 102 in the cache in association with the logical address in the storage destination.

This allows the CM 202 in charge to generate the clock value indicating the acceptance order of the writing request even when the order of the clock scalar value transmitted by the mirror CM 203 is reversed. Furthermore, the transfer of the clock value to the mirror CM 203 by the CM 202 in charge allows the CM 202 in charge and the mirror CM 203 to store the same clock value.

The information storing apparatus described in the present embodiment can be implemented by executing a program prepared in advance by a computer such as a personal computer or a workstation. The present information storing apparatus control program is recorded in a computer-readable recording medium such as a hard disk, a flexible disk, a compact disc (CD)-ROM, a magneto-optical disk (MO), or a digital versatile disc (DVD) and is read out from the recording medium by the computer to be executed. Furthermore, the present information storing apparatus control program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A data storage apparatus that receives a plurality of data writing requests, the data storage apparatus comprising:
   a storage device;
   a first processor coupled to a first memory and configured to
      store first data at a first address region of the storage device in the first memory, the first data being included in a first data writing request among the plurality of data writing requests received by the first processor from an information processing apparatus; and
   a second processor coupled to a second memory and configured to
      store second data at a second address region of the storage device in the second memory, the second data being included in a second data writing request among the plurality of data writing requests received by the second processor from the information processing apparatus, and
      transmit the second data at the second address region of the storage device to the first processor,
   wherein the first processor is configured to
      write a first clock value indicating an acceptance order of the first data writing request from among the plurality of data writing requests and store the first clock value in the first memory with the first data,
      store the second data at the second address region of the storage device in the first memory,
      write a second clock value indicating an acceptance order of the second data writing request from among the plurality of data writing requests and store the second clock value in the first memory with the second data,
      receive a data reading request,
      select and transmit one of the first data and the second data based on the first clock value and the second clock value when the first address region overlaps the second address region and an overlapping address region of the first address region and the second address region corresponds to an address region identified by the data reading request.

2. The data storage apparatus according to claim 1, wherein the first processor is configured to
   compare the first clock value and the second clock value when the first address region overlaps the second address region and an overlapping address region of the first address region and the second address region corresponds to an address region identified by the data reading request, and
   select and transmit, based on the comparison, one of the first data and the second data in response to the data reading request.

3. The data storage apparatus according to claim 1, wherein
   the first processor is configured to
      select one of the first data and the second data based on the first clock value and the second clock value when the first address region overlaps the second address region, and
      store the selected data into the storage device.

4. The data storage apparatus according to claim 1, wherein
   the first processor is configured to
      transmit the first data to the second processor, and
   the second processor is configured to
      store the first data in the second memory,
      store the first clock value and the second clock value in the second memory,
      select one of the first data and the second data based on the first clock value and the second clock value when the first address region overlaps the second address region, and
      store the selected data into the storage device.

5. The data storage apparatus according to claim 1, wherein
   each of the first clock value and the second clock value includes a first initial clock value and a second initial clock value respectively,
   the first processor generates the first clock value by increasing the first initial clock value of the first clock value in case the second processor receives the second data writing request,
   the first processor generates the second clock value by increasing the first initial clock value of the second clock value, and by increasing the second initial clock value of the second clock value in case the first processor receives the first data writing request and in case the second processor receives the second data writing request, and
   when the first processor receives the data reading request, if the first clock value of the second data is greater than the first clock value of the first data, the second data is selected and, if the first clock value of the second data is equal to the first clock value of the first data and the second clock value of the second data is greater than the second clock value of the first data, the second data is selected.

6. The data storage apparatus according to claim 5, wherein
   the first processor is configured to
      transmit the first clock value, the second clock value, the first data, and the first address region, to the second processor.

7. A data control apparatus coupled to a storage apparatus, the control apparatus receiving a plurality of data writing requests, the control apparatus comprising:
   a first processor coupled to a first memory and configured to
      store first data at a first address region of the storage device in the first memory, the first data included in a first data writing request among the plurality of data writing requests received by the first processor from an information processing apparatus; and a second processor coupled to a second memory and configured to
  store second data at a second address region of the storage device in the second memory, the second data included in a second data writing request among the plurality of data writing requests received by the second processor from the information processing apparatus, and
  transmit the second data at the second address region of the storage device to the first processor,
wherein the first processor is configured to
  write a first clock value indicating an acceptance order of the first data writing request from among the plurality of data writing requests and store the first clock value in the first memory with the first data,
  store the second data at the second address region of the storage device in the first memory,
  write a second clock value indicating an acceptance order of the second data writing request from among the plurality of data writing requests and store the second clock value in the first memory with the second data,
  receive a data reading request, and
  select and transmit one of the first data and the second data based on the first clock value and the second clock value when the first address region overlaps the second address region and an overlapping address region of the first address region and the second address region corresponds to an address region identified by the data reading request.

8. A data control method using a storage device and data control apparatus, the data control apparatus including a first memory, a second memory, a first processor coupled to the first memory, and a second processor coupled to the second memory, the data control method comprising:

receiving, by the first processor from an information processing apparatus, a first data writing request at a first address region of the storage device;

storing, by the first processor, the first data in the first memory;

receiving, by the second processor from the information processing apparatus, a second data writing request at a second address region of the storage device;

storing, by the second processor, the second data in the second memory;

transmitting, by the second processor, the second data to the first processor;

writing, by the first processor, a first clock value indicating an acceptance order of the first data writing request from among the plurality of data writing requests and storing, by the first processor, the first clock value in the first memory with the first data;

storing, by the first processor, the second data in the first memory;

writing, by the first processor, a second clock value indicating an acceptance order of the second data writing request from among the plurality of data writing requests and storing, by the first processor, the second clock value in the first memory with the second data;

receiving a data reading request; and selecting and transmitting one of the first data and the second data based on the first clock value and the second clock value when the first address region overlaps the second address region and an overlapping address region of the first address region and the second address region corresponds to an address region identified by the data reading request.

* * * * *